United States Patent [19]

Fayling

[11] 3,897,288

[45] July 29, 1975

[54] FASTENING METHOD USING POLYMER-BASED MAGNETS

[75] Inventor: Richard E. Fayling, White Bear Lake, Minn.

[73] Assignee: Minnesota Mining and Manufacturing Company, St. Paul, Minn.

[22] Filed: June 1, 1971

[21] Appl. No.: 148,991

Related U.S. Application Data

[63] Continuation-in-part of Ser. No. 846,448, July 31, 1969, abandoned.

[52] U.S. Cl. .............. 156/60; 24/73 M; 24/201 B; 52/DIG. 4; 156/309; 161/167; 248/206 A; 335/303
[51] Int. Cl. ............................................. B29e 27/00
[58] Field of Search ........ 156/243, 60, 309; 24/203, 24/204, 73 MS, 201; 161/402, 406, 167; 52/483, DIG. 4; 269/8; 293/1, 62; 335/285; 248/206 A

[56] References Cited
UNITED STATES PATENTS

| | | | |
|---|---|---|---|
| 2,713,379 | 7/1955 | Sisson | 269/8 |
| 2,912,213 | 11/1959 | Krystosek | 24/201 B |
| 2,959,832 | 11/1960 | Baermann | 24/201 B |
| 2,999,275 | 9/1961 | Blume | 156/243 |
| 3,078,183 | 2/1963 | Karalus | 24/73 MS |
| 3,102,314 | 9/1963 | Alderfer | 24/204 |
| 3,111,728 | 11/1963 | Alderfer | 161/402 |
| 3,176,364 | 4/1965 | Dritz | 24/213 |
| 3,213,335 | 10/1965 | Bourne | 335/303 |
| 3,235,427 | 2/1966 | Koritz | 156/71 |
| 3,243,374 | 3/1966 | Gillard | 52/DIG. 4 |
| 3,497,411 | 2/1970 | Chebiniak | 161/406 |

OTHER PUBLICATIONS

"Koroseal Flexible Magnetic Strip," B. F. Goodrich Bul. No. 24, I.P.C., 1060–1062, 7 pp., (1961).

*Primary Examiner*—George F. Lesmes
*Assistant Examiner*—R. J. Roche
*Attorney, Agent, or Firm*—Alexander, Sell, Steldt & Delahunt

[57] ABSTRACT

Fasteners and fastening methods that concurrently apply magnetic forces and adhesive forces to fasten articles together. In a fastener of the invention, layers of a reactive adhesive are carried on exterior bonding faces of a magnetized polymer-based main body portion of the fastener. In other embodiments of the invention, a polymer-based magnet that may or may not carry exterior adhesive layers is placed between adjacent articles during a fastening operation to apply a magnetic force tending to draw the articles together and to apply pressure on adhesive material disposed between the articles.

4 Claims, 10 Drawing Figures

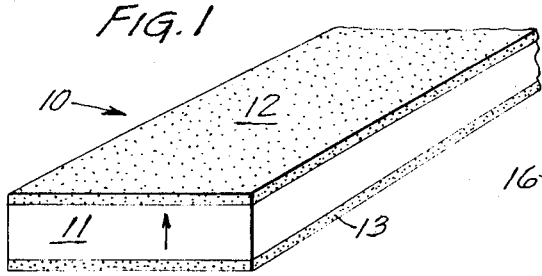
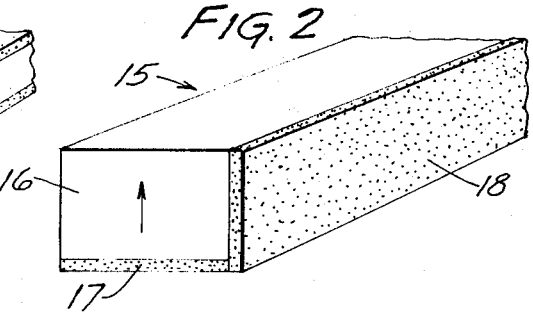
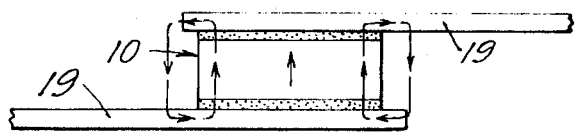
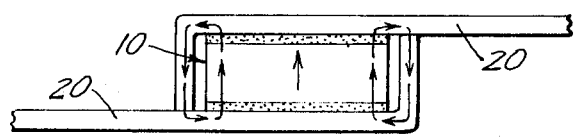
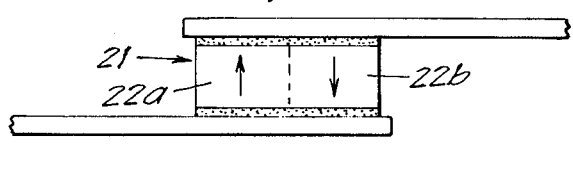
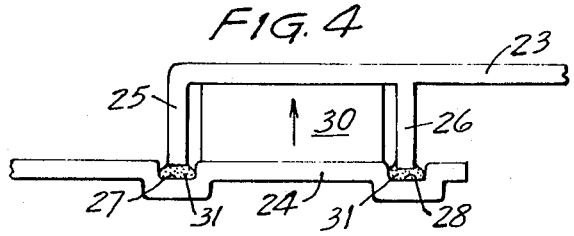
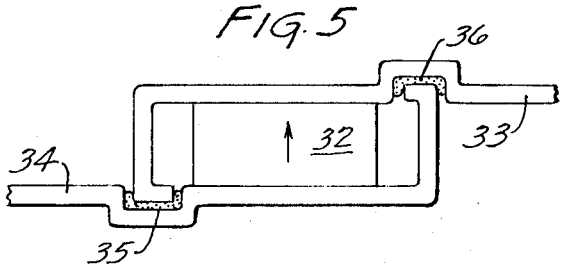
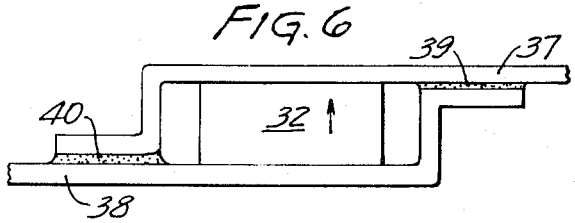
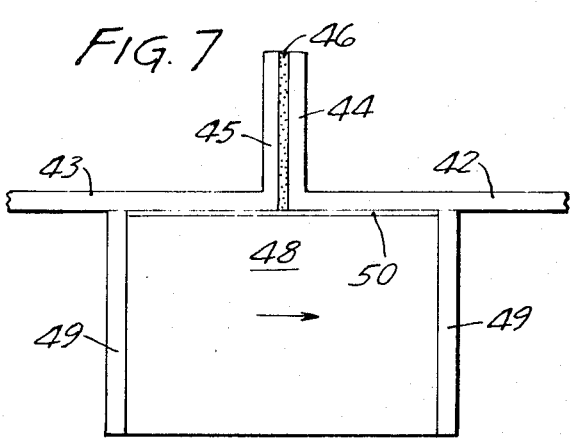
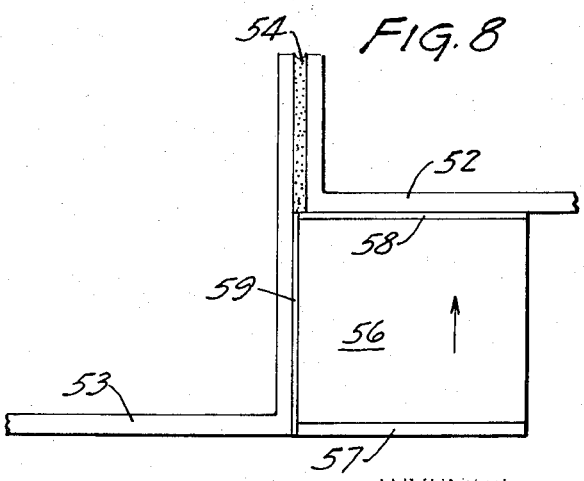

FASTENING METHOD USING POLYMER-BASED MAGNETS

REFERENCE TO RELATED APPLICATION

This application is a continuation of application Ser. No. 846,448, filed July 31, 1969 now abandoned.

The present invention provides a new kind of fastener and new fastening methods that greatly reduce the time, equipment, and manpower required to assemble many metal structures and that, in addition, form superior connections between the parts or articles fastened together. These fasteners and fastening methods combine magnets and adhesives, applying magnetic force and adhesive force concurrently at the area of attachment of the articles. Magnet-adhesive fasteners of the invention generally comprise a main body portion that comprises a polymer based permanent magnet and that has at least two separate exterior bonding faces on which a layer of reactive or curable adhesive material is disposed. The main body portion provides a permanent magnetic force tending to draw a magnetizable article toward each bonding face, while each layer of adhesive material presents a free surface—that is, a surface that is covered, if at all, only by removable structure such as a removable protective liner—adapted to contact and form an adhesive bond with the article drawn toward it. Thus, the magnetic force and adhesion act together to fasten at least two articles together.

In other embodiments of the invention, the magnet usually does not form part of the adhesive bond, but is disposed adjacent (either near or contiguous) the articles during the fastening operation to form a magnetically stable arrangement in which a magnetic force draws the articles toward one another. (A magnetically stable arrangement is one in which no magnetic forces are applied by the magnet to tend to change the position of the articles other than to draw the articles together as desired.) A reactive adhesive material adapted to form an adhesive bond adhering the articles together is disposed between the articles, and the magnetic force drawing the articles together places the adhesive material under compression. In embodiments of the invention in which the magnet does not form part of the adhesive bond the magnet is usually removable from the articles after they are adhered together.

The invention is best practiced with polymer-based magnets, which comprise an organic polymeric matrix and particles of a magnetic material, such as barium, lead, or strontium ferrite, uniformly distributed throughout the matrix. A preferred polymer-based magnet material producing desired high magnetic forces is described in several patents of Blume, including U.S. Pat. Nos. 2,999,275 and 3,359,152. As taught in those patents, substantially domain-size, anisotropic magnetic particles are oriented during the process of manufacture, placing their preferred magnetic axes in substantially parallel alignment so that the magnet material is itself anisotropic. When subjected to a magnetizing force, this preferred magnet material becomes a permanent magnet of high magnetic power; for example, a cube of one commercial variety, one-fourth inch on a side, produces a field of 800 gauss at the surface of the cube.

Polymer-based magnets are readily provided in forms having the shape and size to lie in or adjacent the whole extent of an adhesive joint. For example, in contrast to ceramic or alnico magnets, polymer-based magnets are readily formed in rather thin, narrow, elongated strips or tapes (for example, one foot or more in length) that will extend over at least a substantial length of a long, narrow adhesive bond; or they can be formed in rather large-area sheets of any desired geometric shape; or they can be formed with configured surfaces for use in bonding articles having configured surfaces. Other important advantages of polymer-based magnets are that they may be made flexible and that they are in general quite conveniently handled and applied without danger of breakage.

The fasteners and fastening methods of the invention have a variety of applications in which they replace rivets, bolts, or other fasteners. For example, prefabricated building panels of thin, ribbed sheet-metal, which are usually fastened in place with rivets or bolts, are quickly and conveniently fastened in place according to this invention with a significant reduction in manpower. According to one convenient procedure, magnets or magnet-adhesive fasteners are prepositioned, either at the factory or on the job, on the panel or the cooperating structure to which the panel is to be attached—such as another panel or internal frame structure. With the magnets or magnet-adhesive fasteners in position, the panel is simply raised into position against the rest of the building structure, where it is immediately held by magnetic forces; if necessary, the workers then adjust the position of the panel into proper alignment. The adhesive reacts over a period of time to develop a high-strength permanent adhesive bond while the panel is held in place by magnetic forces. Not only is this procedure easier than previous procedures, but the structure built is a superior one: the adhesive bond provides a seal along the panels; the structure is free from the localized stresses that arose in prior structures around rivets or bolts; the adhesive bond is uniform over the whole bond, because the magnetic force acts rather uniformly over the whole area of the bond; and weld beads, rivet and bolt heads, and the like are eliminated thus aiding in final finishing operations.

The invention also avoids other cumbersome and complicated application methods used in the past. For example, chrome strips for automobiles are conveniently held in place by polymer-based magnet strips positioned within a channel that runs the length of the back of the strip while an adhesive that will permanently bond the strip to the automobile cures. Also, spider frames can be quickly and conveniently attached to the back side of automobile hood panels or the like by using polymer-based magnet strips laid in channels in the arms of the frame to hold the frame against the panel while an adhesive cures.

Magnetic fasteners are of course old; see, for example U.S. Pat. Nos. 2,809,411 and 3,102,314. In addition, magnets have been fastened to and between other articles by adhesives; see, for example, U.S. Pat. No. 3,419,832 where it is suggested that a magnet may be adhered by adhesive between two ferromagnetic plates that are designed to concentrate the magnetic lines of force emanating from the magnet. But the arrangement of magnet and ferromagnetic plates shown in the latter patent is not magnetically stable. That is, since magnetizable structures spaced from one another in a magnetic flux path tend to move to eliminate the space between them, the ferromagnetic plates would slide along a wet adhesive layer applied to the magnet during manufacture of the structure unless the plates were mechanically restrained. And there is no recognition in the patent that magnetic force would facilitate or improve the adhesive bonding of articles. Insofar as is known, no one prior to this invention recognized the advantages that are obtained with polymer-based magnets by concurrently using magnetic and adhesive forces to fasten two or more articles together.

DESCRIPTION OF THE DRAWINGS

FIGS. 1 and 2 are partial views in perspective of illustrative magnet-adhesive fasteners of the invention; and FIGS. 3–8 are partial views in cross-section through magnetizable panels fastened together according to the invention.

The polymer-based magnets useful in the invention are prepared from a variety of organic polymers. In the case of magnet-adhesive fasteners of the invention where the magnet will form part of any adhesive bond, the polymeric matrix in the magnet should be strong and tough so that the magnet will not structurally fail under stresses that the adhesive bond will experience. Elastomers and other polymers that make the magnet somewhat resilient and flexible are preferred, since the magnet is more easily handled and has a wider range of useful jobs; elastomers such as nitrile and silicone elastomers are especially preferred because of their excellent resistance to a variety of environmental conditions. Other useful polymers include polyvinylchloride, especially plasticized polyvinylchloride.

Polymer-based magnets are readily formed in desired shapes by techniques of extrusion, molding, or the like while the magnet material is in a plastic stage of processing, or by various machining methods after the material has hardened. Self-supporting polymer-based magnets are generally at least 25 mils in thickness to ease manufacture and handling, and to provide a strong field. Polymer-based magnet material, including sheets of such material thinner than 25 mils, may be adhered or coated on steel sheets to increase magnetic force by reducing the self-demagnetizing field as well as to make the complete composite magnet more physically strong.

Magnets used in the invention will make the most efficient use of their magnetic power if the articles being adhered together provide a substantially continuous flux path between the poles of the magnet to concentrate the magnetic lines of force emanating from the magnet. The substantially continuous flux path will include the adhesive material between the articles, and other small gaps of similar size may occur in the flux path without destroying the substantial continuity needed to provide satisfactory efficiency of the magnet.

Where adhesive materials are coated on a magnet to form a magnet-adhesive fastener of the invention, the coating of adhesive material must be well anchored to the magnet or develop good anchorage during the fastening operation. The thickness of the adhesive material, either as a layer coated on a magnet or other intermediate structure, or as independently disposed between the articles, will vary depending upon the type of surfaces and materials being adhered together, but in general the layer of adhesive material will be at least 0.1 mil in thickness and preferably at least 1 mil in thickness.

To obtain the best strengths, the adhesive material should comprise reactive adhesive mixtures curable at room or elevated temperatures. These reactive adhesive mixtures take the form of storage-stable films precoated at the factory either onto magnet-adhesive fasteners of the invention or onto some other intermediate structure that is to be included in the adhesive bond, or onto the articles that are to be adhered. Or they take the form of preformed, self-supporting storage-stable films applied between the articles at the time of the fastening operation. In other cases reactive adhesive mixtures are prepared on the job site and coated there on the magnet or articles to be joined. And in other cases reactive adhesive mixtures are initially prepared as two stable components or parts, with one component coated on one adherend and the other component coated on the other adherend.

Some typical forms and applications of the invention are shown in the drawings. FIGS. 1 and 2 illustrate sample magnet-adhesive fasteners of the invention. The fastener 10 shown in FIG. 1 includes an elongated main body portion 11 that typically comprises a polymer-based magnet. (In each of the drawings an arrow on a magnet or base magnet portion indicates the direction of magnetization, with pole faces occurring at surfaces of the magnet transverse to the direction of magnetization.) Layers of adhesive material 12 and 13 are coated on each of the two opposed exterior pole faces of the magnet. The fastener 15 shown in FIG. 2 also includes a magnetized main body portion 16, but the adhesive layers 17 and 18 are coated on adjacent exterior surfaces rather than on opposed surfaces. The fastener of FIG. 1 is much preferred over that of FIG. 2 because the former develops a greater magnetic force upon the articles being adhered. In other embodiments of the invention, three or more of the surfaces of the magnet-adhesive fastener may carry adhesive layers adapted to contact and form adhesive bonds to an article.

FIGS. 3–8 illustrate ways in which thin steel building panels are fastened together according to the invention, the drawings showing sections through the panels. Typically the magnets used are in elongated narrow-strip form extending over at least a substantial portion of the length of long, narrow adhesive bonds. In FIGS. 3A and 3B a magnet-adhesive fastener such as the magnet-adhesive fastener 10 of FIG. 1 is used. In FIG. 3A, the fastener is shown fastening two flat magnetizable panels 19 together. The dotted lines illustrate the path taken by representative magnetic lines of force emanating from the main body portion 11. FIG. 3B illustrates an application of the fastener 10 in which the panels 20 to be joined form a substantially continuous flux path for the magnetic lines of force; the only gaps in the flux path are the layers 12 and 13 of adhesive material. The embodiment of the invention illustrated in FIG. 3B is preferred, since there is a much more efficient use of the magnetic power of the magnetized main body portion 11.

As an example of practice of the invention in a manner similar to that in FIG. 3B, a flat, 30-mil-thick steel building panel 3 feet wide and 8 feet long is adhered to adjacent panels and to three horizontal frame members using an adhesive that comprises an epoxy resin, a polymercaptan, and tris (2,4,6-dimethylaminomethyl) phenol, which develops a high strength in a few hours at normal ambient temperatures. Each of the two long sides of the panel, which are vertical when the panel is in place, are provided with short right-angle flanges that cooperate with similar flanges on adjacent panels to form a substantially continuous flux path in the manner shown in FIG. 3B. Polymer-based magnet strips 1/16-inch-thick, one-half-inch wide, and the length of the panel are preattached on panels at the factory so that there will be a strip adjacent the flange on each of the long sides of the panel. An adhesive is mixed on the job site and coated on the free surface of the magnet immediately prior to placing the panel in place. Separate one-sixteenth-mil-thick, three-eighths-inch-wide, polymer-based magnet strips having a 25-mil-thick steel backing strip adhered to one surface are placed against each of the three horizontal frame members and the panel so as to apply an additional force that presses the panel against the frame member. The panel weighs about 30 pounds and altogether the two preattached magnet strips and the three separate magnets develop a force of about 220 pounds pressing the panel against the adjacent panels and horizontal frame members.

FIG. 3C shows a different magnet-adhesive fastener 21 of the invention which permits good efficiency of magnetic power when adhering simple planar panels together. The magnet 21 includes a magnetized main body portion 22, which as shown, has sections 22a and 22b (shown separated by a broken line) that are magnetized in different directions. Polymer-based magnets are conveniently given such a two-way magnetization.

FIGS. 4-8 illustrate various applications of fastening methods of this invention in which the magnet used is separate from the adhesive material and may be removable from the panels after the adhesive bond has been formed. In FIGS. 4-6 the magnet is disposed between the two panels being bonded together. The panel 23 in FIG. 4 includes two ribs 25 and 26 that register with grooves 27 and 28 formed in the panel 24 to assist in aligning the panels during assembly. A magnet 30 is disposed within the channel between the two ribs 25 and 26 and is smaller in size than the space between the panels 23 and 24 to facilitate its removal from the assembled articles after the fastening operation is completed. Adhesive material 31 is deposited in the grooves 27 and 28 to bond the ribs 25 and 26 to the article 24. Instead of using mechanical means such as the mating ribs and grooves on the panels shown in FIG. 4 to align the panels being adhered together, other embodiments of the invention use magnets preattached to each of the panels in a manner that they will attract one another when brought close together. Thus, elongated polymer-based magnets attached to the edge of panels being assembled will align themselves with respect to one another and at the same time properly align the panels.

FIGS. 5 and 6 show adhesive joints quite similar to the one shown in FIG. 4 with the exception that the articles or panels to be adhered are formed to provide bonding surfaces of larger area. In FIG. 5, a magnet 32 holds together two panels, 33 and 34 while large-area adhesive bonds 35 and 36 are formed, and in FIG. 6 the magnet 32 holds together two panels 37 and 38 while adhesive bonds 39 and 40 are formed.

Strong magnetic force can also be developed on articles being adhered together when the magnet is not physically positioned between the two articles. Such applications are illustrated in FIGS. 7 and 8. In FIG. 7 two panels 42 and 43 having upwardly extending flanges 44 and 45, respectively, are adhered together using adhesive material 46 placed between the flanges. A magnet 48 has magnetizable plates 49 attached to both pole faces of the magnet and with the panels 42 and 43 the plates 49 form a substantially continuous flux path making more efficient use of the magnetic power from the magnet. The magnet 48 is placed against the two panels 42 and 43 and preferably extends over the length of the adhesive bond. The planar surface of the magnet disposed against the panel assures alignment of the panels and serves as a barrier providing a neat edge for the adhesive 46; the planar surface is covered with a layer of release material 50 such as a polytetrafluoroethylene film so that the adhesive will not adhere to the magnet. It has been found that the magnet 48 provides a quite strong magnetic force pressing the flanges 44 and 45 together rather uniformly over their whole area. A neat bond that is uniform in properties results.

In FIG. 8 two panels 52 and 53 are bonded together by adhesive material 54. The magnet 56 has a magnetizable structure 57 disposed on the pole face of the magnet that is not disposed against the panel 52, and also has two layers 58 and 59 of release material. Similarily to the application shown in FIG. 7, a neat bond that is uniform in thickness over the length of the bond is formed.

While the invention has many important advantages as a method for fastening steel building panels, it also has many other important applications. For example, the invention is useful to fasten chrome-covered steel trim strips to the sides of automobiles. In one such operation a magnet is placed in an open interior channel formed in the trim strip and the strip is placed in a groove in the side of an automobile exterior side panel with the magnet close to or substantially contiguous with the surface of the side panel. Adhesive material is disposed between edges of the strip and the side panel. After the adhesive material has at least partially set, the magnet strip can be removed from its position by drawing it out through an opening at the end of the strip. For example, a one-fourth-inch-thick, 1-inch-wide magnet strip five feet long placed in position in the channel of a chrome strip next to an automobile side panel requires an initial force of less than ten pounds to withdraw it, and if the magnet is wrapped in a sleeve of polytetrafluoroethylene, the initial force is less than one pound. Preferably, at least the face or faces of a removable elongated magnet that contact a surface over which the magnet is to be drawn are covered with a low-friction material such as polytetrafluoroethylene.

Magnets having a curved magnet surface are also useful according to this invention. Such a magnet may comprise a set of polymer-based magnet sections in thin sheet form, adjacent magnet sections being separated by a thin magnetizable sheet to which they are adhered. The magnet sections are magnetized in a direction perpendicular to their large-area faces, with adjacent magnet sections being magnetized in opposite directions so that adjacent faces of the magnet sections have a common polarity. The magnetizable sheets concentrate the field from the magnet sections, and magnetic lines of force of opposite polarity emanate from the edges of adjacent magnetizable sheets. The surfaces from which the magnetic lines of force emanate constitute pole surfaces that may be curved in single or complex curvature.

What is claimed is:

1. A method for forming a long narrow adhesive bond fastening at least two magnetizable articles together comprising 1) disposing reactive adhesive material between the articles that cures to form said adhesive bond; concurrently 2) disposing a discrete flexible self-supporting polymer-based magnet in elongated strip form adjacent a substantial length of the articles and adjacent but not bonded to a substantial length of the adhesive material between the articles; 3) arranging the articles so that portions of the articles are joined to form a physical link of magnetizable material extending continuously from one pole to the opposite pole of the magnet except where interrupted by adhesive material, whereby opposite magnetic poles occur at opposite sides of the adhesive material, magnetic lines of force are concentrated through the adhesive material, and a magnetically stable arrangement is formed in which a magnetic force draws the articles toward one another to place the adhesive material under compression; and (4) removing the magnet from its position after the articles are fastened together.

2. A method of claim 1 in which any surface of the magnet that will contact adhesive material during the fastening operation is covered with a layer of release material to which the adhesive material will not adhere.

3. A method of claim 1 in which the magnet is covered with a low-friction material to reduce the force required to draw the magnet along a substrate.

4. A method of claim 1 in which the magnet is positioned between at least portions of the two articles being adhered together.

* * * * *